(12) United States Patent
Hoshiba

(10) Patent No.: US 11,491,827 B2
(45) Date of Patent: Nov. 8, 2022

(54) RUN-FLAT TIRE

(71) Applicant: The Yokohama Rubber Co., LTD., Tokyo (JP)

(72) Inventor: Takashi Hoshiba, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 721 days.

(21) Appl. No.: 16/322,841

(22) PCT Filed: Aug. 1, 2017

(86) PCT No.: PCT/JP2017/027884
§ 371 (c)(1),
(2) Date: Feb. 1, 2019

(87) PCT Pub. No.: WO2018/025853
PCT Pub. Date: Feb. 8, 2018

(65) Prior Publication Data
US 2019/0176543 A1    Jun. 13, 2019

(30) Foreign Application Priority Data
Aug. 2, 2016 (JP) .............................. JP2016-152173

(51) Int. Cl.
*B60C 19/00* (2006.01)
*B60C 17/00* (2006.01)
*B60C 5/00* (2006.01)

(52) U.S. Cl.
CPC .............. *B60C 19/002* (2013.01); *B60C 5/00* (2013.01); *B60C 17/00* (2013.01); *B60C 17/0009* (2013.01)

(58) Field of Classification Search
CPC .......................... B60C 19/002; B60C 17/0009
See application file for complete search history.

(56) References Cited

U.S. PATENT DOCUMENTS

2005/0098251 A1   5/2005  Yukawa
2005/0205183 A1*  9/2005  Yukawa ................ B60C 19/002
                                                          152/450
(Continued)

FOREIGN PATENT DOCUMENTS

DE   10 2015 213 496   1/2017
DE   10 2015 215 738   2/2017
(Continued)

OTHER PUBLICATIONS

JP2013112062 machine translation (Year: 2013).*
(Continued)

*Primary Examiner* — Timothy Kennedy
*Assistant Examiner* — Alexander A Wang
(74) *Attorney, Agent, or Firm* — Thorpe North & Western

(57) ABSTRACT

A run-flat tire is provided with: a carcass layer mounted between a pair of bead portions; and a run-flat reinforcing layer having a crescent-shaped cross-section, provided on a side wall portion on an inner side of the carcass layer in a tire width direction, a band-like sound absorbing member that extends in a tire circumferential direction adhering to a region of a tire inner surface corresponding to a tread portion, wherein the band-like sound absorbing member is locally arranged in at least one shoulder region within the region corresponding to the tread portion.

10 Claims, 7 Drawing Sheets

(56) References Cited

U.S. PATENT DOCUMENTS

| | | |
|---|---|---|
| 2010/0294406 A1 | 11/2010 | Tanno |
| 2016/0339749 A1 | 11/2016 | Yukawa |
| 2017/0008354 A1 | 1/2017 | Sakamoto et al. |
| 2018/0141392 A1 | 5/2018 | Schuermann et al. |
| 2018/0236823 A1 | 8/2018 | Schurmann et al. |

FOREIGN PATENT DOCUMENTS

| | | |
|---|---|---|
| DE | 10 2015 215 740 | 2/2017 |
| JP | H07-304312 | 11/1995 |
| JP | 2001-001726 | 1/2001 |
| JP | 2002-067608 | 3/2002 |
| JP | 3612059 | 1/2005 |
| JP | 2005-138760 | 6/2005 |
| JP | 2006-335208 | 12/2006 |
| JP | 2006-341629 | 12/2006 |
| JP | 2009-061866 | 3/2009 |
| JP | 2010-269767 | 12/2010 |
| JP | 2013-112062 | 6/2013 |
| JP | 2015-147544 | 8/2015 |
| WO | WO 2015/111315 | 7/2015 |
| WO | WO 2015/118707 | 8/2015 |
| WO | WO 2017/012720 | 1/2017 |
| WO | WO 2017/028962 | 2/2017 |
| WO | WO 2017/028963 | 2/2017 |

OTHER PUBLICATIONS https://www.dictionary.com/browse/notch (Year: 2022).*
International Search Report for International Application No. PCT/JP2017/027884 dated Sep. 12, 2017, 4 pages, Japan.

* cited by examiner

RUN-FLAT TIRE

TECHNICAL FIELD

The present technology pertains to a run-flat tire provided with a run-flat reinforcing layer having a crescent-shaped cross section on a side wall portion and, further specifically, pertains to ameliorating run-flat durability and enabling deterioration of high-speed durability to be prevented, through improvements to the shape and arrangement position of a band-like sound absorbing member, which adheres to a tire inner surface.

BACKGROUND ART

A side reinforced run-flat tire, in which a run-flat reinforcing layer having a crescent-shaped cross section is arranged on the inner side of a side wall portion, is proposed as a pneumatic tire that enables travelling while in a punctured state (see, for example, Japan Unexamined Patent Publication Nos. H07-304312 and 2009-61866). In such a side reinforced run-flat tire, the load may be held by the rigidity of the side wall portion, which has been reinforced by the run-flat reinforcing layer. Therefore, a predetermined distance may be traveled even in a state of zero internal pressure.

However, as travelling continues, bending of the tire increases and may lead to damage to the tire due to a bead portion and a tread portion coming into contact in the tire cavity. Therefore, there is a problem in that sufficient travelling distance is not assured while punctured, and the run-flat durability decreases.

Meanwhile, in a pneumatic tire, cavernous resonance due to resonance of the air that fills the tire interior is one cause of noise generation. One proposed method for reducing the noise produced by this phenomenon of cavernous resonance is to provide a sound absorbing member within the cavity formed between the tire and the rim of the wheel. More specifically, a band-like sound absorbing member adheres to a region of the tire inner surface corresponding to the tread portion (see, for example. Japan Unexamined Patent Publication Nos. 2002-67608 and 2005-138760).

However, in the above-described band-like sound absorbing member, the band-like sound absorbing member is arranged in a central region of the tread portion, and as such, the accumulation of heat in the central region of the tread portion during travelling is relatively large. Therefore, there is a concern that the high-speed durability of the tire may be prone to decreasing due to the heat accumulation.

SUMMARY

The present technology supply a run-flat tire that ameliorates run-flat durability and enables the deterioration of high-speed durability to be suppressed, through improvements to the shape and arrangement position of the band-like sound absorbing member that adheres to the tire inner surface.

The run-flat tire of the present technology is provided with a carcass layer mounted between a pair of bead portions and with a run-flat reinforcing layer having a crescent-shaped cross-section, on a side wall portion, arranged on the inner side of the carcass layer in the tire width direction. A band-like sound absorbing member that extends in the tire circumferential direction adheres to a region of the tire inner surface corresponding to a tread portion. The band-like sound absorbing member is locally arranged in at least one shoulder region within the region corresponding to the tread portion.

In the present technology, the band-like sound absorbing member is locally arranged in at least one shoulder region within the region corresponding to the tread portion. As such, when the bending of the tire increases during run-flat travelling, the band-like sound absorbing member functions as an auxiliary member during the run-flat travelling, by preventing an excessive increase in the bending of the tire, which is supported by the band-like sound absorbing member itself. As a result, amelioration of the run-flat durability is made possible. In addition, the amount of accumulated heat in the tread portion during travelling may be reduced in comparison to a situation where the band-like sound absorbing member is arranged in a central region of the tread portion. Therefore, the deterioration of high-speed durability of the run-flat tire may also be suppressed.

In the present technology, the thickness D of the band-like sound absorbing member and the width W of the band-like sound absorbing member preferably satisfy the relationship $D \geq W$. The sound absorbing member must interfere with the rim during run-flat travelling. Therefore, by setting suitable dimensions for the thickness D and the width W of the band-like sound absorbing member in this manner, the band-like sound absorbing member effectively functions as an auxiliary member during run-flat travelling.

In the present technology, the outer end in the tire width direction of the outer circumferential surface of the band-like sound absorbing member is preferably arranged in a region between a maximum width position of a tolerance rim and a minimum width position of the tolerance rim. Contact between the bead portions and the tread portion may occur during run-flat travelling. Therefore, by arranging the band-like sound absorbing member in this manner, the band-like sound absorbing member effectively functions as an auxiliary member during run-flat travelling. The aforementioned tolerance rim is a rim defined for each tire by an applicable standard in a standard system that includes the standard on which the tire is based. For example, for JATMA (Japan Automobile Tyre Manufacturers Association, Inc.), the tolerance rim includes the applicable rim. Specifically, for JATMA, the tolerance rim includes various types of tolerance rims having different rim widths. However, among these, the position of the outer end of the band-like sound absorbing member in the tire width direction on the outer circumferential surface is defined with reference to the width position of the tolerance rim having the greatest rim width and the width position of the tolerance rim having the smallest rim width. A rim that is tolerated for each tire is also termed a tolerance rim for TRA (Tire and Rim Association. Inc.) and ETRTO (European Tyre and Rim Technical Organisation).

In the present technology, the thickness D of the band-like sound absorbing member is preferably from 20% to 70% of a tire cross-sectional height SH. Accordingly, the band-like sound absorbing member functions as an auxiliary member during run-flat travelling, and effective amelioration of the run-flat durability is made possible.

In the present technology, the band-like sound absorbing member preferably has a plurality of notches in the inner circumferential surface. The thickness D of the band-like sound absorbing member is comparatively large.

Therefore, by arranging notches in the band-like sound absorbing member in this manner, the compression force acting on the band-like sound absorbing member during travelling may be alleviated, and improvements to the durability of the band-like sound absorbing member are made possible.

In the present technology, the band-like sound absorbing member preferably has a missing portion in at least one location in the tire circumferential direction. Accordingly, an adhesive surface is capable of withstanding shear strain, produced by expansion during inflation of the tire and by ground contact rolling, over the long term.

In the present technology, the circumferential length of the outer circumferential surface of the band-like sound absorbing member is preferably longer than the circumferential length of the inner circumferential surface of the band-like sound absorbing member. The thickness D of the band-like sound absorbing member is comparatively large. Therefore, by setting suitable dimensions for the band-like sound absorbing member in this manner, the compression force acting on the band-like sound absorbing member during travelling may be alleviated, and amelioration of the durability of the band-like sound absorbing member is made possible.

BRIEF DESCRIPTION OF DRAWINGS

FIG. 7A to 7D are cross-sectional views depicting the run-flat tire of each modified example.

DETAILED DESCRIPTION

Figure 1:
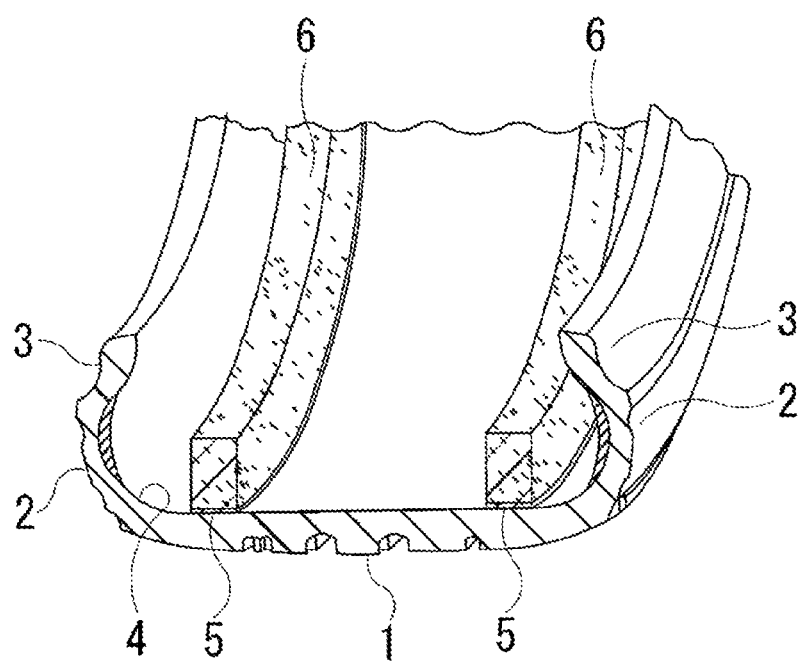
FIG. 1 is a perspective cross-sectional view depicting an example of a run-flat tire comprising an embodiment of the present technology.
Figure 2:
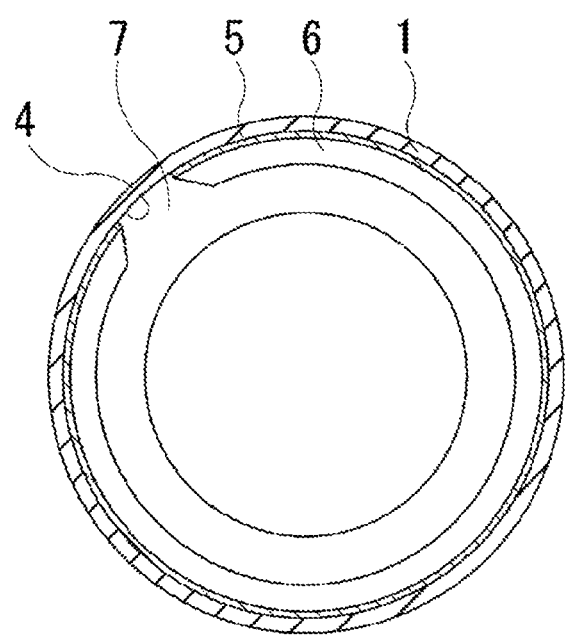
FIG. 2 is an equatorial cross-sectional view depicting an example of a run-flat tire comprising an embodiment of the present technology.
Figure 3:
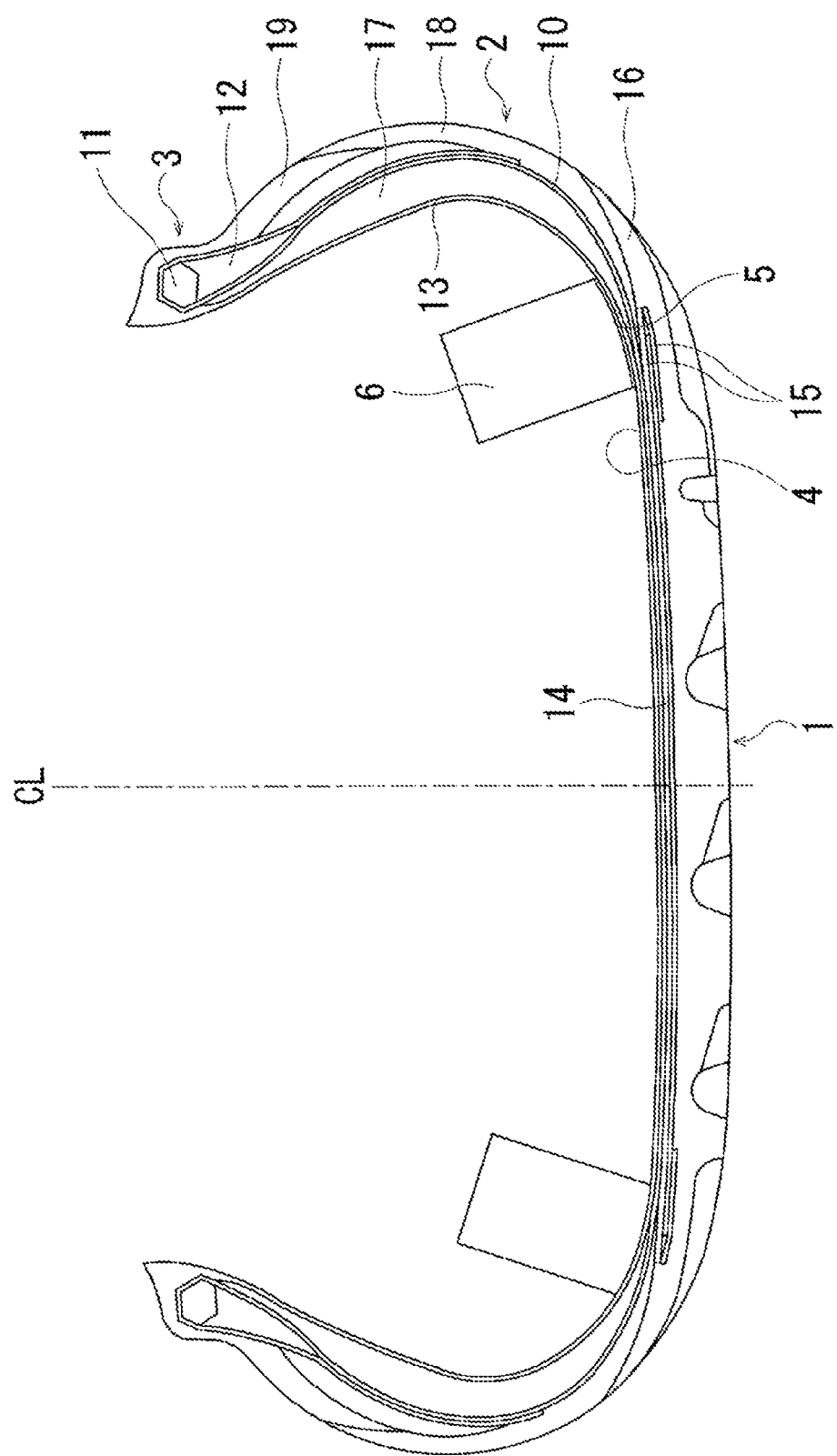
FIG. 3 is a meridional cross-sectional view depicting an example of a run-flat tire comprising an embodiment of the present technology.

The configuration of an embodiment of the present technology is described in detail below with reference to the accompanying drawings. FIG. 1 to FIG. 3 depict an example of a run-flat tire according to an embodiment of the present technology.

In FIGS. 1 and 2, the run-flat tire of the present embodiment is provided with: an annular tread portion 1 that extends in the tire circumferential direction; a pair of side wall portions 2 that are arranged on both sides of the tread portion 1; and a pair of bead portions 3 that are arranged on the inner side of each of the side wall portions 2 in the tire radial direction.

In the run-flat tire, a band-like sound absorbing member 6, 6 is provided as a pair, locally adhering to a region of a tire inner surface 4 that corresponds to the tread portion 1, with an adhesive layer 5 extending along the tire circumferential direction disposed therebetween. The band-like sound absorbing member 6 is configured from a porous material that has open cells, and has predetermined sound absorbing characteristics based on the structure of the porous material. A polyurethane foam may be used as the porous material for the band-like sound absorbing member 6. Meanwhile, a double-sided adhesive tape is preferably used as the adhesive layer 5.

As indicated in FIG. 3, at least one layer of a carcass layer 10 is mounted between the pair of bead portions 3, 3. The carcass layer 10 includes a plurality of carcass cords that are oriented in the tire radial direction. Organic fiber cords are preferably used as the carcass cords. The carcass layer 10 is wound, from the inner side to the outer side of the tire, around a bead core 11 that is arranged on each of the bead portions 3. Furthermore, the carcass layer 10 surrounds a bead filler 12 and extends to terminating ends in the vicinity of the side wall portions 2. The bead filler 12 has a triangle-shape cross-section and is arranged on the tire outer circumferential side of the bead cores 11. Also, an inner liner layer 13 is arranged on the tire inner surface, in a region between the pair of bead portions 3, 3.

Meanwhile, a belt layer 14 is embedded in the tread portion 1, on the tire outer circumferential side of the carcass layer 10. The belt layer 14 includes a plurality of reinforcing cords that are inclined with respect to the tire circumferential direction. Also, the reinforcing cords are arranged so as to intersect each other between layers. In the belt layer 14, the inclination angle of the reinforcing cords with respect to the tire circumferential direction is, for example, in a range of from 10° to 40°. Steel cords are preferably used as the reinforcing cords of the belt layer 14. At least one layer of a belt cover layer 15, which is formed by aligning reinforcing cords at an angle of no more than 5° with respect to the tire circumferential direction, is arranged on the tire outer circumferential side of the belt layer 14, with the objective of improving the high-speed durability. The belt cover layer 15 preferably forms a jointless structure in which a strip material, which is formed by arranging at least one reinforcing cord and coating the reinforcing cord with rubber, has been continuously wound in the tire circumferential direction. In addition, the belt cover layer 15 may be arranged so as to cover the entirety of the belt layer 14 in the width direction, or may be arranged so as to cover only an edge portion on the outer side of the belt layer 14 in the width direction. Organic fiber cord cords of nylon, aramid, etc., are preferably used as the reinforcing cords of the belt cover layer 15.

Furthermore, a tread rubber layer 16 is arranged on the tread portion 1, on the outer side of the belt layer 14 and the belt cover layer 15. A run-flat reinforcing layer 17 that has a crescent-shaped cross section is arranged on the side wall portions 2, between the carcass layer 10 and the inner liner layer 13, in order to enable run-flat travelling. A side wall rubber layer 18 is arranged on each of the side wall portions 2, on the outer side of the carcass layer 10. A rim cushion rubber layer 19 is arranged on each of the bead portions 3, on the outer side of the carcass layer 10.

Each band-like sound absorbing member 6, 6 of the pair has a rectangular cross-sectional shape, and is arranged so as to have lateral symmetry with reference to a tire center line CL. In the aspect depicted in FIGS. 1 and 3, an example is depicted in which the band-like sound absorbing member 6 is arranged on each member of a pair of left and right shoulder regions, within a region of the tire inner surface 4 corresponding to the tread portion 1. Or the band-like sound absorbing member 6 may be disposed on one of left and right shoulder regions. Also, the band-like sound absorbing member 6 is not arranged across the tire center line CL, and is locally arranged at a position outside the central region of the tread portion 1.

In the run-flat tire described above, the band-like sound absorbing member 6 is locally arranged in at least one shoulder region of the tread portion 1. As such, when the bending of the tire increases during run-flat travelling, the band-like sound absorbing member 6 functions as an auxiliary member during the run-flat travelling, by preventing an excessive increase in the bending of the tire, which is supported by the band-like sound absorbing member 6 itself. As a result, amelioration of the run-flat durability is made possible. In addition, the amount of accumulated heat in the tread portion 1 during travelling may be reduced in comparison to a situation where the band-like sound absorbing member 6 is arranged in the central region of the tread portion 1. Therefore, the deterioration of high-speed durability may also be suppressed.

Figure 4:
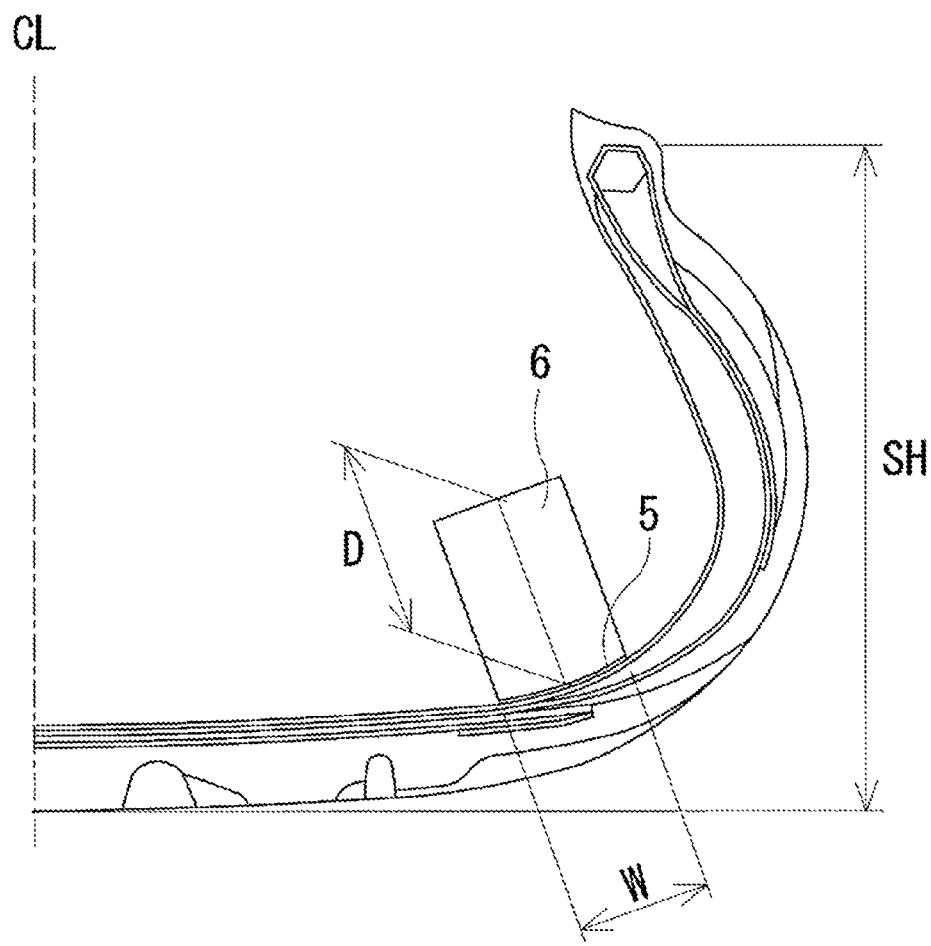
FIG. 4 is a cross-sectional view depicting the dimensions of a band-like sound absorbing member of FIG. 3.

As indicated in FIG. 4, the thickness D of the band-like sound absorbing member 6 is the maximum thickness, and the width W of the band-like sound absorbing member 6 is the maximum value of the width on the adhesive surface side of the band-like sound absorbing member 6 with respect to the tire. Here, the thickness D of the band-like sound absorbing member 6 and the width W of the band-like sound absorbing member 6 satisfy the relationship D≥W. Furthermore, the ratio D/W of the thickness D of the band-like sound absorbing member 6 and the width W of the band-like sound absorbing member 6 is preferably from 1.0 to 3.0. During run-flat travelling, the sound absorbing member 6 must interfere with the rim. Therefore, by setting suitable dimensions for the thickness D and the width W of the band-like sound absorbing member 6 in this manner, the band-like sound absorbing member 6 effectively functions as an auxiliary member during run-flat travelling.

In addition, the thickness D of the band-like sound absorbing member 6 is beneficially configured so as to be from 20% to 70% with respect to the tire cross-sectional height SH. By suitably setting the thickness D of the band-like sound absorbing member 6 with respect to the tire cross-sectional height SH in this manner, the band-like sound absorbing member 6 effectively functions as an auxiliary member during run-flat travelling. This configuration enables effective improvements to the run-flat durability. Here, when the thickness D of the band-like sound absorbing member 6 is less than 20% of the tire cross-sectional height SH, the band-like sound absorbing member 6 becomes excessively thin and tends not to sufficiently function as an auxiliary member during run-flat traveling, while on the other hand, exceeding 70% leads to concerns regarding lowering of the rim mount performance.

Figure 5:
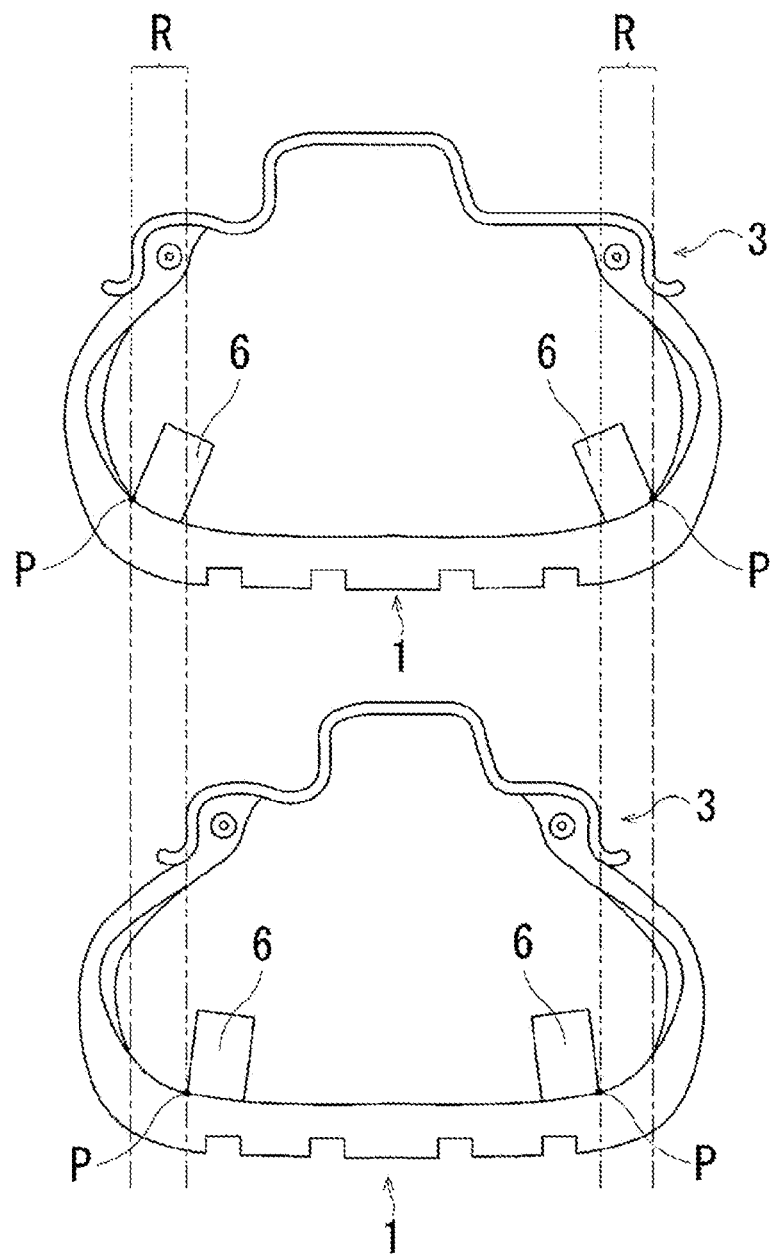
FIG. 5 is an explanatory diagram depicting the arrangement position of a band-like sound absorbing member that adheres to the inner surface of the run-flat tire of the present technology.

FIG. 5 illustrates the arrangement position of the band-like sound absorbing member 6 adhering to the inner surface of the run-flat tire. The outer circumferential surface of the band-like sound absorbing member 6, that is, the outer end in the tire width direction of the surface that adheres to the tire inner surface 4, is termed the outer end P. The upper diagram in FIG. 5 depicts a state in which the outer end P of the band-like sound absorbing member 6 is disposed at a maximum width position of the tolerance rim (depicted as the single-chained line). The lower diagram in FIG. 5 depicts a state in which the outer end P of the band-like sound absorbing member 6 is disposed at a minimum width position of the tolerance rim (depicted as the double-chained line). That is, the band-like sound absorbing member 6 is disposed such that the outer end P thereof is located within a region R between the maximum width position of the tolerance rim and the minimum width position of the tolerance rim. During run-flat travelling, contact between the bead portions 3 and the tread portion 1 may occur. Therefore, by arranging the band-like sound absorbing member 6 in this manner, the band-like sound absorbing member 6 effectively functions as an auxiliary member during run-flat travelling. Also, this manner of functioning is also made possible with respect to various applicable tolerance rims.

Figure 6:
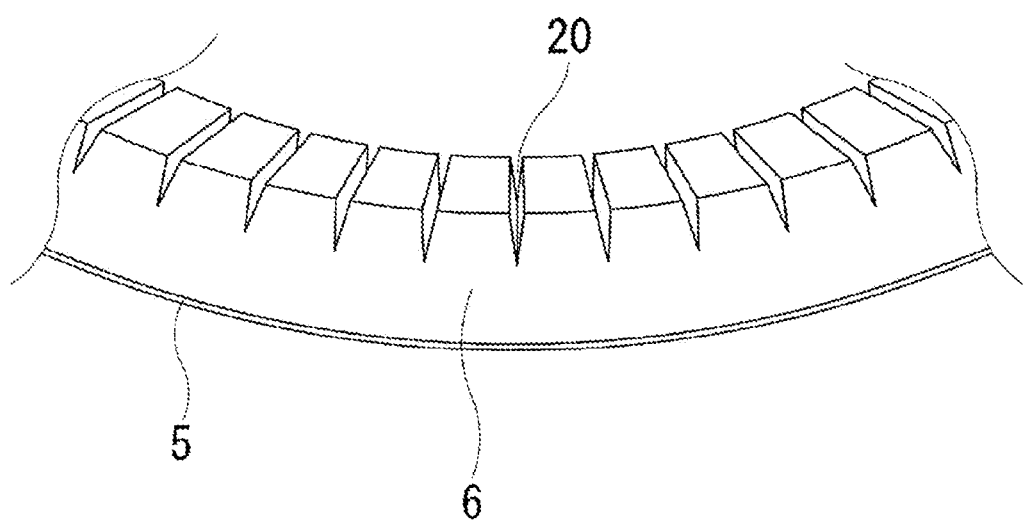
FIG. 6 is a perspective view diagram depicting a portion of a modified example of a band-like sound absorbing member that adheres to the inner surface of the run-flat tire of the present technology.

FIG. 6 illustrates a portion of a modified example of the band-like sound absorbing member adhering to the inner surface of the run-flat tire of the present technology. As depicted in FIG. 6, a plurality of notches 20 that extend in the tire width direction are formed in the inner circumferential surface of the band-like sound absorbing member 6, that is, in the surface that does not adhere to the tire inner surface. Both ends of each of the notches 20 are in communication with both end parts of the band-like sound absorbing member 6 in the width direction. In addition, the notches 20 are only open to the inner circumferential surface of the band-like sound absorbing member 6, and are not open to the outer circumferential surface of the band-like sound absorbing member 6. The thickness D of the band-like sound absorbing member 6 is large in comparison to the width W. Therefore, by arranging the notches 20 in the band-like sound absorbing member 6 in this manner, the compression force acting on the band-like sound absorbing member 6 during travelling may be alleviated, and amelioration of the durability of the band-like sound absorbing member 6 is made possible.

Here, an aspect may be adopted in which one of the end parts of each of the notches 20 terminates on the inner side of the band-like sound absorbing member 6, and only the other end part of each of the notches 20 is in communication with the end parts of the band-like sound absorbing member 6 in the width direction. Alternatively, both end parts of each of the notches 20 may terminate on the inner side of the band-like sound absorbing member 6, and not communicate with the two end parts of the band-like sound absorbing member 6 in the width direction.

As indicated in FIG. 2, the band-like sound absorbing member 6 has a missing portion 7 in one location in the tire circumferential direction. The missing portion 7 is a portion on the tire circumference where the band-like sound absorbing member 6 is not present. Providing the missing portion 7 in the band-like sound absorbing member 6 enables shear strain in the adhesion surface, caused by expansion during inflation of the tire, to be withstood over the long term. This, in turn, enables the shear strain produced in the adhesion surface of the band-like sound absorbing member 6 to be effectively alleviated. A missing portion 7 configured in this manner is beneficially provided in one location, or in three to five locations, on the tire circumference. That is, providing the missing portion 7 in two locations on the tire circumference leads to significant deterioration of tire uniformity caused by mass unbalance, and providing the missing portion 7 in six or more locations on the tire circumference leads to a significant increase in manufacturing costs.

Here, providing the missing portion 7 in two or more locations on the tire circumference interrupts the band-like sound absorbing member 6 in the tire circumferential direction. However, despite such a situation, configuring the band-like sound absorbing member 6 in plurality from another layered material, such as an adhesive layer that is made up of double-sided adhesive tape, for example, and arranging these band-like sound absorbing members 6 so as to be continuous with each other enables these band-like sound absorbing members 6 to be handled as a single integrated member, and as such, enables the adhesion to the tire inner surface 4 to be performed as a simple operation.

In addition, as indicated in FIG. 2, in a circumferential direction cross-section of the band-like sound absorbing member 6, the circumferential length of the outer circumferential surface is configured so as to be longer than the circumferential length of the inner circumferential surface of the band-like sound absorbing member 6. In other words, the band-like sound absorbing member 6 has a trapezoidal cross-sectional shape such that the circumferential length of the surface adhering to the tire is longer. The thickness D of the band-like sound absorbing member 6 is comparatively large. Therefore, by setting suitable dimensions for the band-like sound absorbing member 6 in this manner, the compression force acting on the band-like sound absorbing member 6 during travelling may be alleviated, and amelioration of the durability of the band-like sound absorbing member 6 is made possible.

Figure 7A:
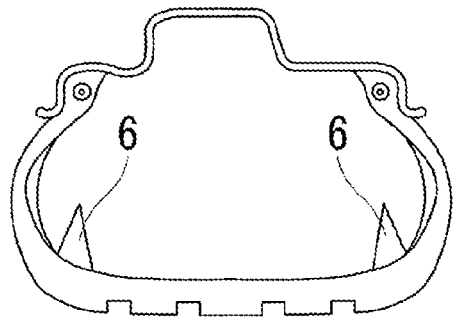
FIG. 7A to 7D each depict modified examples of the cross-sectional shape of the band-like sound absorbing member that adheres to the inner surface of the run-flat tire of the present technology.
Figure 7B:
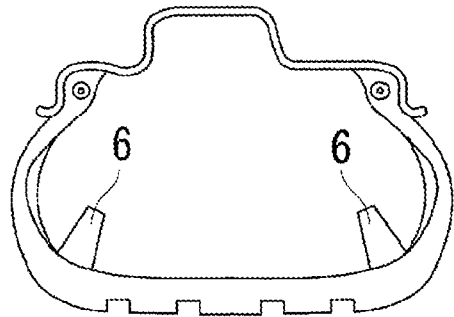
Figure 7C:
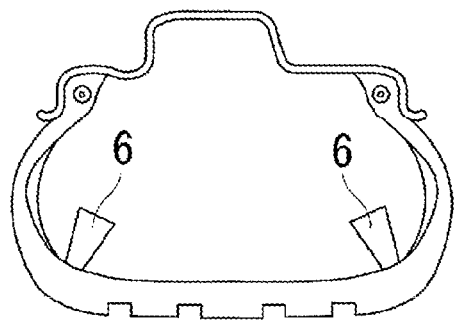
Figure 7D:
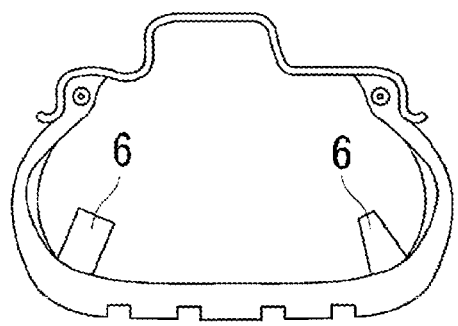

The lateral cross-sectional shape of the band-like sound absorbing member 6 may be a quadrilateral, as depicted in FIGS. 1 and 3 to 5, or may, for example, be a triangle with the adhesion surface side on the bottom edge, as depicted in FIG. 7A, a long-bottom trapezoid with the adhesion surface side on the bottom side as depicted in FIG. 7B, a short-bottom trapezoid with the adhesion surface side on the bottom side as depicted in FIG. 7C, or a combination of a quadrilateral and a trapezoid as depicted in FIG. 7D.

EXAMPLES

A conventional example, a comparative example, and examples 1 to 10 of a run-flat tire having a tire size of 245/50R19, provided with a carcass layer that is mounted between a pair of bead portions, and with a run-flat reinforcing layer having a crescent-shaped cross-section, on a side wall portion, arranged on the inner side of the carcass layer in the tire width direction, in which a band-like sound absorbing member that extends in the tire circumferential direction adheres to a region of the tire inner surface corresponding to a tread portion, have been configured as per table 1 and table 2 in terms of the presence of a band-like sound absorbing member, the arrangement position of the band-like sound absorbing member, the ratio (D/W) of the thickness D to the width W of the band-like sound absorbing member, the proportion (D/SH×100%) of the thickness D of the band-like sound absorbing member to the tire cross-sectional height SH, the presence of notches in the band-like sound absorbing member, and the cross-sectional shape in the circumferential direction of the band-like sound absorbing member.

Here, regarding the presence of notches in the band-like sound absorbing member, when notches are present in the band-like sound absorbing member, the notches are provided as a plurality of notches extending in the width direction of the band-like sound absorbing member, that are in communication with both end parts of the band-like sound absorbing member.

In addition, regarding the cross-sectional shape of the band-like sound absorbing member, when the band-like sound absorbing member has a missing portion along the tire circumferential direction, the cross-sectional shape of the entire band-like sound absorbing member is indicated.

These test tires were evaluated in terms of run-flat durability, high-speed durability, and band-like sound absorbing member durability at high-bending times using the methods described below. The results are given in table 1 and table 2 in combination.

Run-Flat Durability:

Each test tire was mounted on a wheel having a rim size of 19×7.5 and subjected to a travelling test on a drum testing machine under conditions of an air pressure of 0 kPa and a load of 5.9 kN (65% of maximum load capacity). Specifically, a travelling speed of 80 km/h was maintained until the occurrence of failure in the tire, and the distance traveled at that point was measured. A longer distance traveled indicates superior run-flat durability.

High-Speed Durability:

Each test tire was mounted on a wheel having a rim size of 19×7.5, and subjected to a travelling test on a drum testing machine under conditions of an air pressure of 360 kPa, and a load of 6.17 kN. Specifically, starting from an initial speed of 250 km/h, the speed was increased by 10 km/h every 20 minutes until the occurrence of failure in the tire, and the step (speed) reached at that point was measured. A greater step (speed) reached indicates superior high-speed durability.

Band-Like Sound Absorbing Member Durability During High Bending:

Each test tire was mounted on a wheel having a rim size of 19×7.5, and subjected to a travelling test on a drum testing machine under conditions of a traveling speed of 80 km/h, an air pressure of 160 kPa, a load of 9.25 kN (102% of maximum load capacity), and a distance traveled of 6480 km. Afterward, peeling of the band-like sound absorbing member and rupture of the band-like sound absorbing member was visually confirmed. Situations where the band-like sound absorbing member did not fall off or break are marked "excellent". Situations where adhesive surface peeling or breakage of the band-like sound absorbing member occur in less than ⅛ of the entire band-like sound absorbing member are marked "good". Situations where the adhesive surface peeling or breakage of the band-like sound absorbing member occur in at least ⅛ and less than ¼ of the entire band-like sound absorbing member are marked "marginal", and situations where the adhesive surface peeling or breakage of the band-like sound absorbing member occur in at least ¼ of the entire band-like sound absorbing member are marked "fail".

TABLE 1

|  | Conventional Example | Comparative Example | Example 1 | Example 2 | Example 3 | Example 4 |
| --- | --- | --- | --- | --- | --- | --- |
| Presence of band-like sound absorbing member | No | Yes | Yes | Yes | Yes | Yes |
| Arrangement position of band-like sound absorbing member | — | Center portion | Shoulder portion | Shoulder portion | Shoulder portion | Shoulder portion |

TABLE 1-continued

|  | Conventional Example | Comparative Example | Example 1 | Example 2 | Example 3 | Example 4 |
|---|---|---|---|---|---|---|
| Ratio (D/W) of the thickness D to the width W of the band-like sound absorbing member | — | 1.0 | 1.0 | 2.0 | 3.0 | 4.5 |
| Proportion (D/SH × 100%) of the thickness D of the band-like sound absorbing member to the tire cross-sectional height SH | — | 15% | 15% | 15% | 15% | 15% |
| Presence of notches in the band-like sound absorbing member | — | No | No | No | No | No |
| Cross-sectional shape of the band-like sound absorbing member in the circumferential direction | — | Rectangular | Rectangular | Rectangular | Rectangular | Rectangular |
| Run-flat durability | 80 km | 80 km | 93 km | 106 km | 106 km | 106 km |
| High-speed durability | 290 km/h | 270 km/h | 290 km/h | 290 km/h | 290 km/h | 290 km/h |
| Band-like sound absorbing member durability during high bending | — | Good | Good | Good | Good | Good |

TABLE 2

|  | Example 5 | Example 6 | Example 7 | Example 8 | Example 9 | Example 10 |
|---|---|---|---|---|---|---|
| Presence of band-like sound absorbing member | Yes | Yes | Yes | Yes | Yes | Yes |
| Arrangement position of band-like sound absorbing member | Shoulder portion | Shoulder portion | Shoulder portion | Shoulder portion | Shoulder portion | Shoulder portion |
| Ratio (D/W of the thickness D to the width W of the band-like sound absorbing member | 3.0 | 3.0 | 3.0 | 3.0 | 3.0 | 3.0 |
| Proportion (D/SH × 100%) of the thickness D of the band-like sound absorbing member to the tire cross-sectional height SH | 20% | 45% | 70% | 75% | 45% | 45% |
| Presence of notches in the band-like sound absorbing member | No | No | No | No | Yes | Yes |
| Cross-sectional shape of the band-like sound absorbing member in the circumferential direction | Rectangular | Rectangular | Rectangular | Rectangular | Rectangular | Trapezoidal |

TABLE 2-continued

| | Example 5 | Example 6 | Example 7 | Example 8 | Example 9 | Example 10 |
|---|---|---|---|---|---|---|
| Run-flat durability | 129 km | 129 km | 129 km | 129 km | 120 km | 120 km |
| High-speed durability | 290 km/h | 290 km/h | 290 km/h | 290 km/h | 290 km/h | 290 km/h |
| Band-like sound absorbing member durability during high bending | Good | Good | Good | Good | Excellent | Excellent |

As indicated by table 1 and table 2, the run-flat tire of examples 1 to 10 has ameliorated run-flat durability, with no deterioration of high-speed durability, in comparison to the conventional example. In addition, examples 9 and 10 are provided with notches in a thick band-like sound absorbing member. Therefore, the durability of the band-like sound absorbing member during high bending is good. Conversely, in the comparative example, the band-like sound absorbing member is arranged in the center portion of the tread portion. Therefore, the effect of sufficient amelioration of run-flat durability is not possible, and degradation of the high-speed durability occurs.

The invention claimed is:

1. A run-flat tire comprising:
a carcass layer mounted between a pair of bead portions;
a run-flat reinforcing layer having a crescent-shaped cross-section, provided on a side wall portion on an inner side of the carcass layer in a tire width direction, and
a band-like sound absorbing member that extends in a tire circumferential direction adhering to a region of a tire inner surface corresponding to a tread portion, wherein
the band-like sound absorbing member is only locally arranged in at least one shoulder region within the region corresponding to the tread portion,
a thickness D of the band-like sound absorbing member and a width W of the band-like sound absorbing member satisfy a relationship such that D≥W,
the tread portion comprises at least one circumferential groove in the at least one shoulder region, the at least one circumferential groove being a laterally outermost circumferential groove of the tread portion, and
the band-like sound absorbing member is disposed entirely laterally outward of the at least one circumferential groove.

2. The run-flat tire according to claim 1, wherein
an outer end in the tire width direction of an outer circumferential surface of the band-like sound absorbing member is disposed in a region between a maximum width position and a minimum width position of a tolerance rim.

3. The run-flat tire according to claim 2, wherein
the thickness D of the band-like sound absorbing member is from 20% to 70% of a tire cross-sectional height SH.

4. The run-flat tire according to claim 3, wherein
an inner circumferential surface of the band-like sound-absorbing member has a plurality of notches.

5. The run-flat tire according to claim 4, wherein
the band-like sound absorbing member has a missing portion in at least one location in the tire circumferential direction.

6. The run-flat tire according to claim 5, wherein
a circumferential length of an outer circumferential surface of the band-like sound absorbing member is longer than a circumferential length of an inner circumferential surface of the band-like sound absorbing member.

7. The run-flat tire according to claim 1, wherein
a thickness D of the band-like sound absorbing member is from 20% to 70% of a tire cross-sectional height SH.

8. The run-flat tire according to claim 1, wherein
an inner circumferential surface of the band-like sound-absorbing member has a plurality of notches.

9. The run-flat tire according to claim 1, wherein
the band-like sound absorbing member has a missing portion in at least one location in the tire circumferential direction.

10. The run-flat tire according to claim 1, wherein
a circumferential length of an outer circumferential surface of the band-like sound absorbing member is longer than a circumferential length of an inner circumferential surface of the band-like sound absorbing member.

* * * * *